United States Patent
Sodano et al.

(10) Patent No.: US 10,776,617 B2
(45) Date of Patent: Sep. 15, 2020

(54) SIGN-LANGUAGE AUTOMATED TELLER MACHINE

(71) Applicant: Bank of America Corporation, Charlotte, NC (US)

(72) Inventors: Thomas A. Sodano, New York City, NY (US); Morgan S. Allen, Waxhaw, NC (US); Alicia C. Jones-McFadden, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 16/277,839

(22) Filed: Feb. 15, 2019

(65) Prior Publication Data

US 2020/0265222 A1    Aug. 20, 2020

(51) Int. Cl.
*G06K 9/00* (2006.01)
*G07F 19/00* (2006.01)
*G06F 40/242* (2020.01)

(52) U.S. Cl.
CPC ....... *G06K 9/00355* (2013.01); *G06F 40/242* (2020.01); *G06K 9/00744* (2013.01); *G07F 19/207* (2013.01)

(58) Field of Classification Search
CPC .......... G06F 3/017; G06F 3/011; G06F 3/005; G07F 19/201; G07F 19/20; G07F 19/202; G07F 19/207; G07F 19/203; G06K 9/00375; G06K 2209/01; G06K 9/00335; G06K 9/00389; G06K 9/00355; G06K 9/00993; G06K 2009/3291; G06K 9/00382
See application file for complete search history.

(56) References Cited

U.S. PATENT DOCUMENTS

| | | | |
|---|---|---|---|
| 1,008,990 A | 11/1911 | Prouty | |
| 5,659,764 A * | 8/1997 | Sakiyama | G06F 3/017 340/4.13 |
| 5,887,069 A * | 3/1999 | Sakou | G06K 9/00355 382/100 |
| 5,890,120 A | 3/1999 | Haskell et al. | |
| 5,982,853 A * | 11/1999 | Liebermann | H04M 1/2475 379/52 |
| 6,181,778 B1 * | 1/2001 | Ohki | G09B 21/009 348/14.01 |
| 7,774,194 B2 | 8/2010 | Liebermann et al. | |

(Continued)

FOREIGN PATENT DOCUMENTS

GB    2422449 A * 7/2006 ............. G06F 40/40

*Primary Examiner* — Allahyar Kasraian
(74) *Attorney, Agent, or Firm* — Michael A. Springs

(57) ABSTRACT

An automated teller machine includes a camera, a memory, and a hardware processor. The camera captures video data from a user, including at least one hand movement. The processor receives the video data from the camera and splits it into a sequence of images. The processor then splits each image into a set of features and forms vectors from the features. The processor uses the vectors to determine if each image belongs to a subset of images corresponding to a motionless sign-language pattern, or to a subset of images corresponding to a moving sign-language pattern. The processor stores the words and/or phrases assigned to each identified sign-language pattern in an input phrase. The processor determines that the input phrase represents a user request and then processes the request.

20 Claims, 5 Drawing Sheets

(56) References Cited

U.S. PATENT DOCUMENTS

| | | | |
|---|---|---|---|
| 9,172,790 B2 | 10/2015 | Garg | |
| 9,230,160 B1 | 1/2016 | Kanter | |
| 9,473,627 B2 | 10/2016 | Thelin et al. | |
| 9,721,481 B2 | 8/2017 | Shovkoplias | |
| 9,965,467 B2 | 5/2018 | Dharmarajan Mary | |
| 10,037,458 B1 | 7/2018 | Mahmoud et al. | |
| 2014/0171036 A1 | 6/2014 | Simmons | |
| 2016/0062987 A1* | 3/2016 | Yapamanu | H04M 3/42 704/2 |
| 2017/0236450 A1* | 8/2017 | Jung | G09B 21/009 704/3 |
| 2018/0075659 A1 | 3/2018 | Browy et al. | |
| 2019/0019189 A1* | 1/2019 | Sanders | G06Q 20/409 |

* cited by examiner

SIGN-LANGUAGE AUTOMATED TELLER MACHINE

TECHNICAL FIELD

This disclosure relates generally to data terminals, such as automated teller machines.

BACKGROUND

Automated teller machines (ATMs) are used by organizations as a convenient means for providing services to users. Rather than having to visit a physical office location during business hours, a user can visit an ATM and complete a transaction by providing an identifying card to the ATM, entering a pin code to verify his/her identity, and interacting with the ATM using an attached keypad. Recently, ATMs have also been deployed with microphones and video screens which enable users to converse with a remote teller assistant. Such service is desirable for those users who encounter difficulties when using the ATM, or those who wish to interact with a teller outside of regular business hours.

SUMMARY OF THE DISCLOSURE

Automated teller machines (ATMs) are used by organizations as a convenient means for providing services to users. Rather than having to visit a physical office location during business hours, a user can visit an ATM and complete a transaction by providing an identifying card to the ATM, entering a pin code to verify his/her identity, and interacting with the ATM using an attached keypad. Recently, ATMs have also been deployed with microphones and video screens which enable users to converse with a remote teller assistant. Such service is desirable for those users who encounter difficulties when using the ATM, or those who wish to interact with a teller outside of regular business hours.

While conventional ATMs offer convenience to many customers, those customers who are deaf may not be able to fully engage with these machines, particularly those equipped with remote teller assistants. Additionally, deaf individuals who also experience vision problems, may have difficulty reading the ATM keypad and screen. As a result, not only are such individuals unable to use the remote teller assistant feature of newer ATMs, they are essentially foreclosed from all of the other conveniences ATMs offer.

This disclosure contemplates an unconventional automated teller machine that addresses one or more of the above issues. In addition to having input entered using a keypad (or microphone if interacting with a remote teller assistant), the ATM allows users to present requests using sign-language hand gestures, captured by a camera included in the ATM. The ATM is then able to compare the user's hand gestures to a dictionary of sign-language words and phrases stored in memory, and thereby translate the gestures into an input request. In this manner, certain embodiments enable deaf users to interact with all aspects of an ATM, including a remote teller assistant feature. Additionally, certain embodiments of the ATM allow users to store a unique and/or personal hand gesture in memory, as a user passcode. This hand gesture may then be used by the user to authenticate his/her identity each time the user initiates an interaction with the ATM. A unique and/or personal hand gesture may be desirable over a simple four-digit pin code for authentication as it may be harder to guess, or otherwise discover.

Thus, certain embodiments of the ATM provide improvements over traditional ATMs not only for deaf users, but also for any user wishing to enhance the security measures associated with his/her ATM interactions. Certain embodiments of the sign-language ATM are described below.

According to one embodiment, an automated teller machine includes a camera, a memory, and a hardware processor communicatively coupled to the camera and the memory. The camera captures video data from a user. The video data includes at least one hand movement generated by the user. The memory stores a dictionary of sign-language patterns. Each sign-language pattern is assigned to a word or a phrase. The dictionary includes a first collection of feature vectors. Each feature vector of the first collection is assigned to a first type of sign-language pattern including a motionless sign-language hand position. The dictionary also includes a second collection of groupings of feature vectors. Each grouping of feature vectors of the second collection includes at least two feature vectors and is assigned to a second type of sign-language pattern including a moving sign-language hand gesture. The processor receives the video data from the camera. The processor further splits the video data into a first image, a second image, a third image, and a fourth image. The processor then splits the first image into a first set of features and forms a first feature vector based on the first set of features. The processor also splits the second image into a second set of features and forms a second feature vector based on the second set of features. The processor additionally splits the third image into a third set of features and forms a third feature vector based on the third set of features. The processor also splits the fourth image into a fourth set of features and forms a fourth feature vector based on the fourth set of features. The processor further determines a first distance between the first feature vector and the second feature vector and determines that the first distance is within a set tolerance. In response to determining that the first distance is within the set tolerance, the processor compares the first feature vector to the feature vectors in the first collection of feature vectors. The processor also determines, based on the comparison of the first feature vector to the feature vectors in the first collection of feature vectors, that the first feature vector corresponds to a first motionless sign-language hand position assigned to a first word or a first phrase. The processor further stores the first word or the first phrase in an input phrase. The processor additionally determines a second distance between the second feature vector and the third feature vector and determines that the second distance is not within the set tolerance. The processor also determines a third distance between the third feature vector and the fourth feature vector and determines that the third distance is not within the set tolerance. In response to determining that the second distance is not within the set tolerance and that the third distance is not within the set tolerance the processor compares the third feature vector and the fourth feature vector to the groupings of feature vectors in the second collection of groupings of feature vectors. The processor also determines, based on the comparison of the third feature vector and the fourth feature vector to the groupings of feature vectors in the second collection of groupings of feature vectors, that the third feature vector and the fourth feature vector comprise a first moving sign-language hand gesture assigned to a second word or a second phrase. The processor further stores the second word or the second phrase in the input phrase. The processor additionally determines that the input phrase represents a user request. In response to determining that the input phrase represents the user request, the processor processes the user request.

According to another embodiment, a method for an automated teller machine includes receiving video data from a camera. The camera captures the video data from a user. The video data includes at least one hand movement generated by the user. The method also includes splitting the video data into a first image, a second image, a third image, and a fourth image. The method further includes splitting the first image into a first set of features and forming a first feature vector based on the first set of features. The method also includes splitting the second image into a second set of features and forming a second feature vector based on the second set of features. The method additionally includes splitting the third image into a third set of features and forming a third feature vector based on the third set of features. The method further includes splitting the fourth image into a fourth set of features and forming a fourth feature vector based on the fourth set of features. The method additionally includes determining a first distance between the first feature vector and the second feature vector and determining that the first distance is within a set tolerance. In response to determining that the first distance is within the set tolerance, the method includes comparing the first feature vector to feature vectors stored in a first collection of feature vectors. Each feature vector of the first collection is assigned to a first type of sign-language pattern including a motionless sign-language hand position. The method further includes determining, based on the comparison of the first feature vector to the feature vectors stored in the first collection of feature vectors, that the first feature vector corresponds to a first motionless sign-language hand position assigned to a first word or a first phrase. The method also includes storing the first word or the first phrase in an input phrase. The method further includes determining a second distance between the second feature vector and the third feature vector and determining that the second distance is not within the set tolerance. The method also includes determining a third distance between the third feature vector and the fourth feature vector and determining that the third distance is not within the set tolerance. In response to determining that the second distance is not within the set tolerance and that the third distance is not within the set tolerance, the method includes comparing the third feature vector and the fourth feature vector to groupings of feature vectors stored in a second collection of groupings of feature vectors, where each grouping of feature vectors stored in the second collection includes at least two feature vectors and is assigned to a second type of sign-language pattern including a moving sign-language hand gesture. The method further includes determining, based on the comparison of the third feature vector and the fourth feature vector to the groupings of feature vectors in the second collection of groupings of feature vectors, that the third feature vector and the fourth feature vector include a first moving sign-language hand gesture assigned to a second word or a second phrase. The method also includes storing the second word or the second phrase in the input phrase. The method additionally includes determining that the input phrase represents a user request. In response to determining that the input phrase represents the user request, the method includes processing the user request.

According to a further embodiment, a system includes an automated teller machine, a camera, a storage element and a processing element communicatively coupled to the automated teller machine, the camera, and the storage element. The camera captures video data from a user. The video data includes at least one hand movement generated by the user. The storage element stores a dictionary of sign-language patterns. Each sign-language pattern is assigned to a word or a phrase. The dictionary includes a first collection of feature vectors. Each feature vector of the first collection is assigned to a first type of sign-language pattern including a motionless sign-language hand position. The dictionary also includes a second collection of groupings of feature vectors. Each grouping of feature vectors of the second collection includes at least two feature vectors and is assigned to a second type of sign-language pattern including a moving sign-language hand gesture. The processing element is operable to receive the video data from the camera. The processing element is further operable to split the video data into a first image, a second image, a third image, and a fourth image. The processing element is additionally operable to split the first image into a first set of features and form a first feature vector based on the first set of features. The processing element is also operable to split the second image into a second set of features and form a second feature vector based on the second set of features. The processing element is additionally operable to split the third image into a third set of features and form a third feature vector based on the third set of features. The processing element is further operable to split the fourth image into a fourth set of features and form a fourth feature vector based on the fourth set of features. The processing element is also operable to determine a first distance between the first feature vector and the second feature vector and determine that the first distance is within a set tolerance. In response to determining that the first distance is within the set tolerance, the processing element is operable to compare the first feature vector to the feature vectors in the first collection of feature vectors. The processing element is also operable to determine, based on the comparison of the first feature vector to the feature vectors in the first collection of feature vectors, that the first feature vector corresponds to a first motionless sign-language hand position assigned to a first word or a first phrase. The processing element is additionally operable to store the first word or the first phrase in an input phrase. The processing element is further operable to determine a second distance between the second feature vector and the third feature vector and determine that the second distance is not within the set tolerance. The processing element is also operable to determine a third distance between the third feature vector and the fourth feature vector and determine that the third distance is not within the set tolerance. In response to determining that the second distance is not within the set tolerance and that the third distance is not within the set tolerance the processing element is operable to compare the third feature vector and the fourth feature vector to the groupings of feature vectors in the second collection of groupings of feature vectors. The processing element is also operable to determine, based on the comparison of the third feature vector and the fourth feature vector to the groupings of feature vectors in the second collection of groupings of feature vectors, that the third feature vector and the fourth feature vector include a first moving sign-language hand gesture assigned to a second word or a second phrase. The processing element is further operable to store the second word or the second phrase in the input phrase. The processing element is additionally operable to determine that the input phrase represents a user request. In response to determining that the input phrase represents a user request, the processing element is operable to send the input phrase to a device belonging to the user.

The processing element is also operable to receive a response from the user indicating that the input phrase is correct. The processing element is further operable to process the user request.

Certain embodiments provide one or more technical advantages. For example, an embodiment enables a deaf individual to interact with a remote teller assistant component of an ATM. As another example, an embodiment enables a deaf individual who is also visually impaired and unable to adequately see the ATM keypad and/or display to accurately provide input to an ATM. As a further example, an embodiment improves the security measures available for individuals accessing their banking accounts through an ATM, by enabling the individuals to store a unique and/or personal hand gesture as a passcode, which they can then use to access their account rather than entering a less-secure 4-digit pin code. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Automated teller machines (ATMs) are used by organizations as a convenient means for providing services to users. Rather than having to visit a physical office location during business hours, a user can visit an ATM and complete a transaction by providing an identifying card to the ATM, entering a pin code to verify his/her identity, and interacting with the ATM using an attached keypad. Recently, ATMs have also been deployed with microphones and video screens which enable users to converse with a remote teller assistant. Such service is desirable for those users who encounter difficulties when using the ATM, or those who wish to interact with a teller outside of regular business hours.

While conventional ATMs offer convenience to many customers, those customers who are deaf may not be able to fully engage with these machines, particularly those equipped with remote teller assistants. Additionally, deaf individuals who also experience vision problems, may have difficulty reading the ATM keypad and screen. As a result, not only are such individuals unable to use the remote teller assistant feature of newer ATMs, they are essentially foreclosed from all of the other conveniences ATMs offer.

This disclosure contemplates an unconventional automated teller machine that addresses one or more of the above issues. In addition to having input entered using a keypad (or microphone if interacting with a remote teller assistant), the ATM allows users to present requests using sign-language hand gestures, captured by a camera included in the ATM. The ATM is then able to compare the user's hand gestures to a dictionary of sign-language words and phrases stored in memory, and thereby translate the gestures into an input request. In this manner, certain embodiments enable deaf users to interact with all aspects of an ATM, including a remote teller assistant feature. Additionally, certain embodiments of the ATM allow users to store a unique and/or personal hand gesture in memory, as a user passcode. This hand gesture may then be used by the user to authenticate his/her identity each time the user initiates an interaction with the ATM. A unique and/or personal hand gesture may be desirable over a simple four-digit pin code for authentication as it may be harder to guess, or otherwise discover. Thus, certain embodiments of the ATM provide improvements over traditional ATMs not only for deaf users, but also for any user wishing to enhance the security measures associated with his/her ATM interactions. The security tool will be described in more detail using FIGS. 1 through 5.

Figure 1:
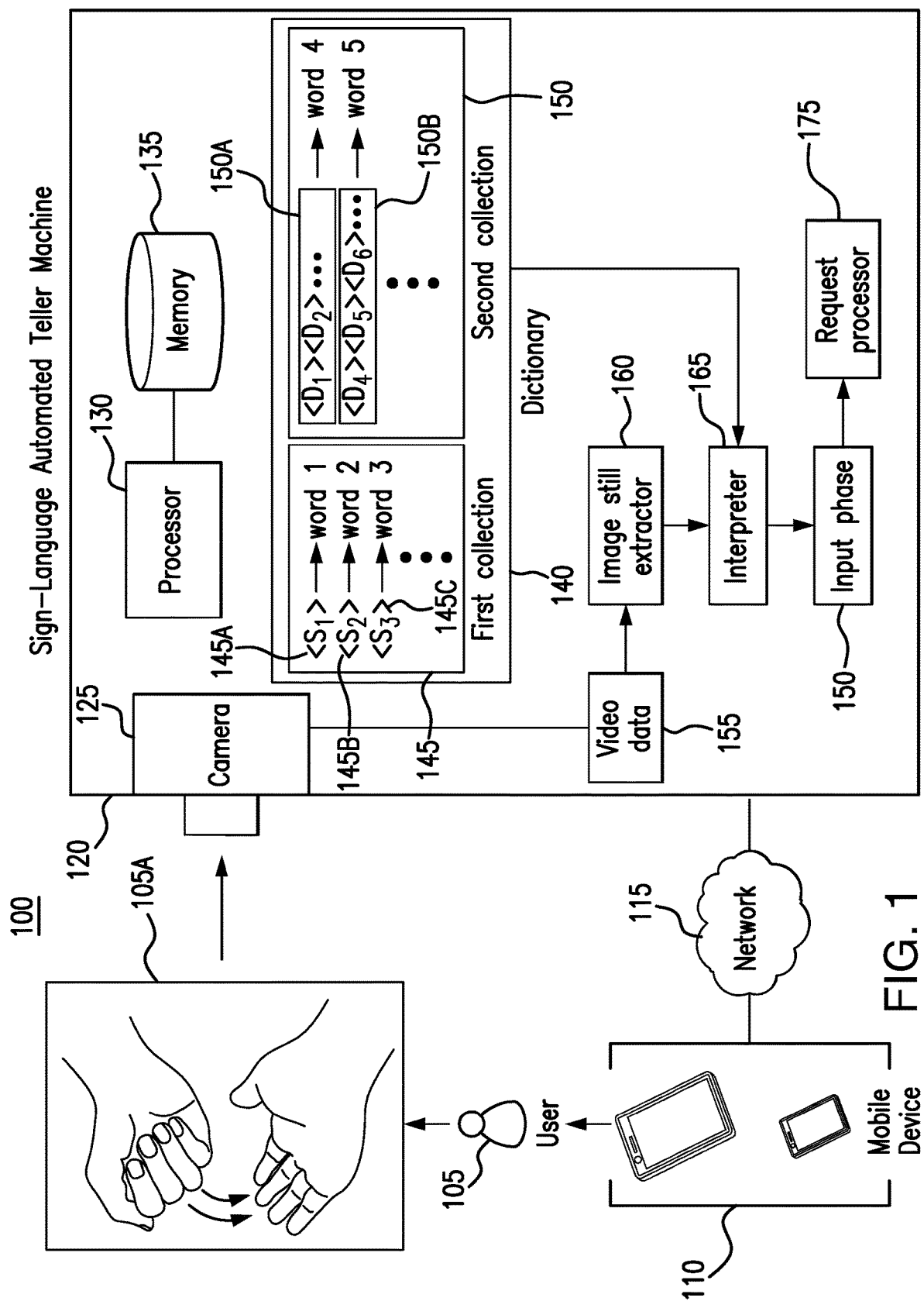
FIG. 1 illustrates an example system.

FIG. 1 illustrates an example system 100. As seen in FIG. 1, system 100 includes one or more devices 110, a network 115, and a sign-language automated teller machine (ATM) 120. Generally, ATM 120 receives video data 155 from camera 125, including hand gestures 105A generated by user 105. ATM 120 then splits the video data 155 into a set of images, using image still extractor 160. Interpreter 165 then examines the images to determine which images correspond to motionless sign-language patterns and/or which images correspond to moving sign-language gestures. Interpreter 165 then compares the motionless and/or moving sign-language patterns/gestures to a sign-language dictionary 140 stored in memory 135 to construct input phrase 170. ATM 120 than transfers input phrase 170 to request processor 175, which determines that input phrase 170 corresponds to a user request and processes the request. In this manner, certain embodiments of ATM 120 enable a deaf individual to operate an ATM using sign-language.

In certain embodiments, mobile devices 110 receive messages from ATM 120 including the input phrase 170 translated from sign-language video data 155 by ATM 120. This allows user 105 to confirm, using his/her mobile device 110, that ATM 120 correctly translated the sign-language request 105A. In further embodiments, mobile device 110 also receives account information from ATM 120, which ATM 120 sends to mobile device 110 when ATM 120 determines that input phrase 170 corresponds to a request for account information. In certain embodiments, the messages sent by ATM 120 and received by mobile device 110 are text messages or mobile application notifications. Receiving input phrase 170 may be desirable when communicating with a remote teller assistant using ATM 120, to ensure that remote teller assistant, to which ATM 120 is providing input 170, is receiving the correct input from user 105. Receiving input phrase 170 and/or account information may also be desirable when user 105 is visually impaired (but not blind). This is because user 105 can control the size of text displayed on his/her mobile device 110; therefore user 105 may be able to confirm the accuracy of input phrase 170 or read his/her account information using mobile device 110 even though user 105 cannot see well enough to use the keypad and display on ATM 120. In certain embodiments, after mobile device 110 has received a message from ATM 120 including input phrase 170, user 105 also uses mobile device 110 to send a message to ATM 120 confirming the accuracy of input phrase 170.

Mobile devices 110 include any appropriate device for communicating with components of system 100 over network 115. For example, mobile devices 110 may be a mobile phone, a laptop, a tablet, and/or an automated assistant. This disclosure contemplates mobile device 110 being any appropriate portable device for sending and receiving communications over network 115. As an example, and not by way of limitation, device 110 may be a laptop, a wireless or cellular telephone, an electronic notebook, a personal digital assistant, a tablet, or any other device capable of receiving, processing, storing, and/or communicating information with other components of system 100. Mobile device 110 may also include a user interface, such as a display, a microphone, keypad, or other appropriate terminal equipment usable by user 105. In some embodiments, an application executed by mobile device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As seen in FIG. 1, sign-language ATM 120 includes a camera 125, a processor 130, and a memory 135. This disclosure contemplates processor 130 and memory 135 being configured to perform any of the functions of ATM 120 described herein. Generally, ATM 120 extracts image stills from video data 155 using image still extractor 160, translates the sign-language patterns represented by the image stills into input phrase 170 using interpreter 165, and processes the request represented by input phrase 170 using request processor 175. Interpreter 165 is described in further detail below in the discussion of FIG. 2.

Camera 125 is used to visually monitor users 105. This disclosure contemplates that camera 125 is any piece of equipment capable of capturing digital video data including hand gestures generated by users 105. Camera 125 includes a lens capable of focusing and directing incident light to a sensor of camera 125. The lens may be a piece of glass or other transparent substance. Camera 125 is set at an angle of view that is wide enough to capture a wide range of hand gestures from various users 105 of different sizes.

Processor 130 is any electronic circuitry, including, but not limited to microprocessors, application specific integrated circuits (ASIC), application specific instruction set processor (ASIP), and/or state machines, that communicatively couples to memory 135 and controls the operation of sign-language ATM 120. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of sign-language ATM 120 by processing information received from network 115, mobile device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Memory 135 also stores a dictionary 140 of sign-language patterns and the letters/words/phrases they are associated with. Dictionary 140 includes two collections of sign-language patterns: a first collection 145 that stores motionless sign-language patterns, and a second collection 150 that stores moving sign-language gestures. To represent each motionless sign-language pattern, memory 135 stores vectors 145A, 145B, 145C composed of features. In certain embodiments, these features include locations/orientations of various parts of each finger on each hand. For motionless sign-language patterns, only a single feature vector 145A, 145B, or 145C is required to represent a pattern. For moving sign-language gestures, multiple feature vectors must be used to represent each gesture—just as a video includes multiple frames. Thus, to represent each moving sign-language gesture, memory 135 stores groups of feature vectors 150A, 150B, and 150C. This disclosure contemplates that motionless sign-language patterns are those sign-language patterns for which meaning is acquired based on the orientations of a user's hands and the positions of the user's fingers. In contrast, moving sign-language gestures are those sign-language patterns for which meaning is acquired based on movements created by the user's hands (including changes in hand orientation and/or finger position) in addition to the orientations of the user's hands and the positions of the user's fingers.

Image still extractor 160 is a software module stored in memory 135 and executed by processor 130. Image still extractor takes video data 155 as input and splits video data 155 into a series of image stills. This process is described in further detail below, in the discussion of FIG. 2.

Interpreter 165 is a software module stored in memory 135 and executed by processor 130. Interpreter 165 uses dictionary 140 to translate sign-language input, captured as video data 155 by camera 125, into input phrase 170. Interpreter 165 takes image stills, extracted from video data 155 by image still extractor 160, and forms feature vectors using those image stills. Interpreter 165 then determines whether each image still corresponds to a motionless sign-language pattern, or a moving sign-language gesture, by comparing sequential feature vectors to one another, as described in further detail below in the discussion of FIG. 2. If interpreter 165 determines that a feature vector corresponds to a motionless sign-language pattern, it next compares the feature vector to those feature vectors 145A, 145B, and 145C stored in first collection 145 in dictionary 140, to determine which word or phrase the feature vector represents. This disclosure contemplates that a word can include a single letter—for example, the letter "k"—or a number. If interpreter 165 determines that a sequence of feature vectors corresponds to a moving sign-language pattern, it next compares the sequence of feature vectors to those groups of feature vectors 150A and 150B, stored in second collection 150 in dictionary 140, to determine which word or phrase the sequence of feature vectors represents. In this manner, sign-language ATM 120 is able to construct input phrase 170 from a user's hand movements 105A.

In certain embodiments, memory 135 can also store a user-generated hand gesture. In such embodiments, ATM 120 receives video data 155 containing the user-generated hand gesture and splits the video data 155 into a sequence of image stills using image still extractor 160. ATM 120 then forms feature vectors from the sequence of image stills, which it stores in memory 135. In certain embodiments, a user 105 may use his/her user-generated hand gesture to authenticate his/her identity, rather than using a traditional 4-digit passcode. In such embodiments, when user 105 enters his/her card into ATM 120, a message appears on the display of ATM 120 requesting that user 105 provide his/her passcode. Camera 125 then captures video data 155 of the user's hand gesture 105A, from which image still extractor 160 generates a sequence of image stills. Interpreter 165 then forms feature vectors from the image stills and compares to the feature vectors stored as the user's passcode, in memory 135. If interpreter 165 determines that the video data corresponds to video of user 105 signing his/her passcode, ATM 120 provides user 105 access to his/her banking account, which user 105 can then access as he/she normally would, using a conventional ATM.

In certain embodiments, system 100 enables deaf users 105 to interact with aspects of an ATM 120, including a remote teller assistant feature. By converting video of a user's hand gestures 105A into a sequence of feature vectors and comparing those feature vectors to ones stored in a sign-language dictionary 140, sign-language ATM 120 is able to convert a sign-language request into a text-based request 170, which ATM 120 can process, using traditional methods, or send to a remote teller assistant. Additionally, certain embodiments of ATM 120 allow users to store a unique and/or personal hand gesture in memory as a user passcode. This hand gesture may then be used by user 105 to authenticate his/her identity each time the user initiates an interaction with ATM 120. A unique and/or personal hand gesture may be desirable over a simple four-digit pin code for authentication as it may be harder to guess, or otherwise discover. Thus, certain embodiments of the ATM provide improvements over traditional ATMs not only for deaf users, but also for any user wishing to enhance the security measures associated with his/her ATM interactions.

Figure 2:
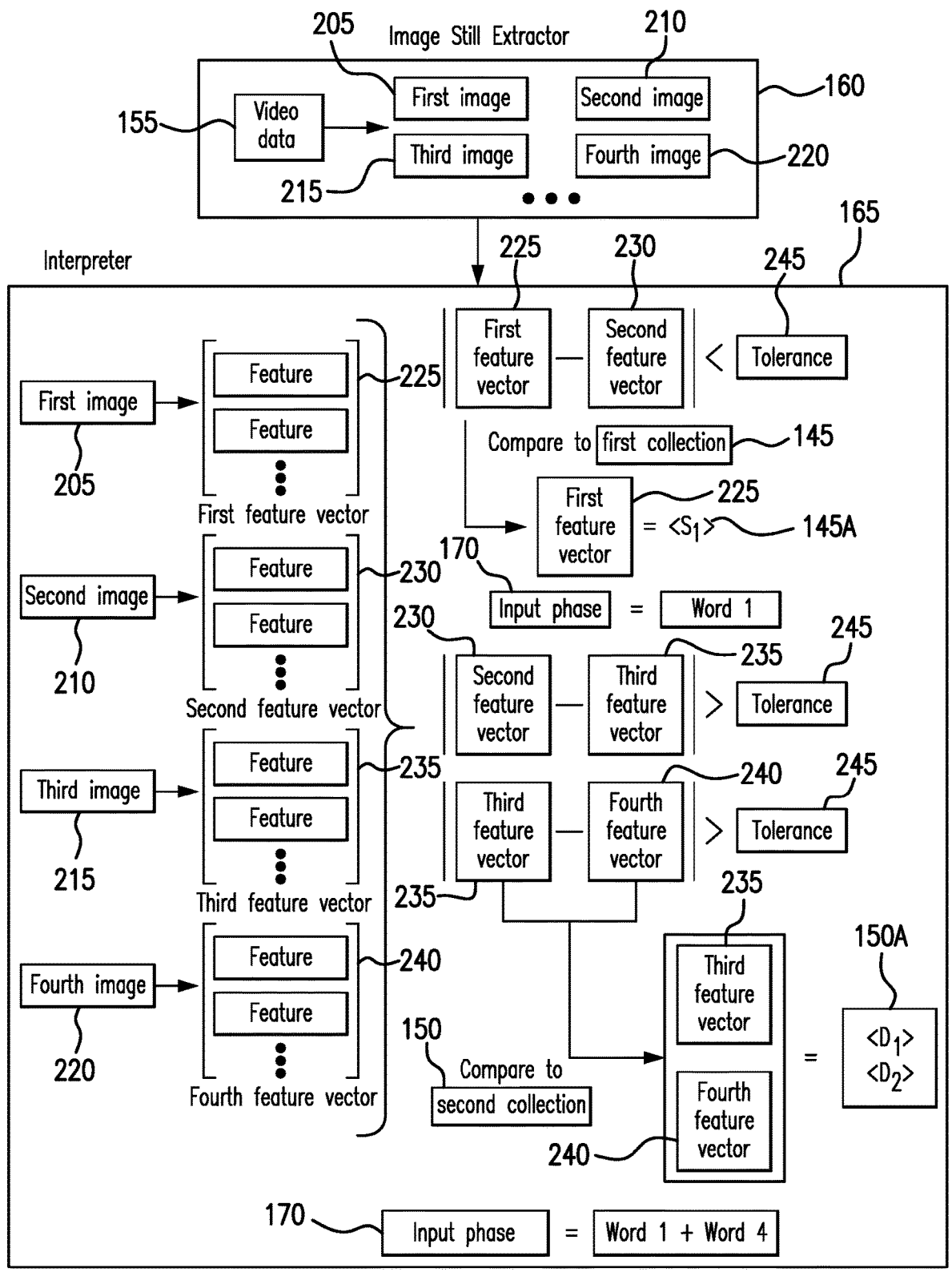
FIG. 2 illustrates the image still extractor and interpreter components of the sign-language automated teller machine in the system of FIG. 1.

FIG. 2 illustrates the steps performed by image still extractor 160 and interpreter 165 of sign-language ATM 120. Interpreter 165 takes as input image stills 205, 210, 215, and 220 extracted from video data 155 by image still extractor 160. For simplicity, this example considers only four image stills, first image 205, second image 210, third image 215, and fourth image 220. However, this disclosure contemplates that image still extractor 160 can extract any number of stills from video data 155, consistent with the total amount of video data 155 available.

Interpreter 165 splits each image still into a set of features. In certain embodiments, these features include locations/orientations of various parts of each finger on each hand. Interpreter 165 then forms feature vectors from the features. For example, interpreter 165 splits first image still 205 into the set of features and forms first feature vector 225 using these features. Similarly, interpreter 165 forms second feature vector 230 from second image still 210, third feature vector 235 from third image still 215, and fourth feature vector 240 from fourth image still 220. In certain embodiments, interpreter 165 uses a machine learning model to split the images into features. For example, a machine learning model may be trained to extract image pixels corresponding to the hands of a user 105 from image stills 205, 210, 215, and 220.

Interpreter 165 next compares each feature vector to sequential feature vectors, to determine if the feature vector corresponds to a motionless sign-language pattern, or a moving sign-language gesture. For example, interpreter 165 compares first feature vector 225 to second feature vector 230 by determining a distance between first feature vector 225 and second feature vector 230. If the distance is less than a set tolerance 245, interpreter 165 assumes that first feature vector 225 and second feature vector 230 correspond to the same motionless sign-language pattern. Alternatively, in certain embodiments, interpreter 165 compares first feature vector 225 to second feature vector 230 by determining a similarity index, based on the dot product between the two vectors. If the similarity index is above a set threshold, interpreter 165 assumes that first feature vector 225 and second feature vector 230 correspond to the same motionless sign-language pattern. Interpreter 165 then compares first feature vector 225 to feature vectors 145A, 145B, and 145C stored in first collection 145 in dictionary 140 to determine to which letter/word/phrase first feature vector 225 corresponds.

In certain embodiments, this comparison includes determining the distance between first feature vector 225 and each of feature vectors 145A, 145B, and 145C, to find the closest match. In further embodiments, ATM 120 uses a machine learning model to determine which of feature vectors 145A, 145B, and 145C first feature vector 225 most closely resembles. For example, in certain embodiments the machine learning model includes a linear classifier model. This model attaches weights to each feature of feature vectors 145A, 145B, 145C, and first feature vector 225, and determines the similarity between first feature vector 225 and feature vectors 145A, 145B, and 145C based on the dot product between first feature vector 225 and feature vectors 145A, 145B, and 145C. The weights used by the model are chosen by training the model on a set of feature vectors for which the results are known, to determine the optimal values for the weights. In addition to a linear classifier model, this disclosure contemplates that any machine learning model may be used by interpreter 165. Once interpreter 165 has determined which word or phrase first feature vector 225 corresponds to, interpreter 164 adds this word or phrase to input phrase 170.

Interpreter 165 next determines whether third feature vector 235 corresponds to the same motionless sign-language pattern as first feature vector 225 and second feature vector 230, or to a new pattern. In certain embodiments, interpreter 165 compares third feature vector 235 to second feature vector 230 by determining a distance between third feature vector 235 and second feature vector 230. If the distance is greater than a set tolerance 245, interpreter 165 assumes that third feature vector 235 corresponds to a different sign-language pattern than first feature vector 225 and second feature vector 230. In certain embodiments, interpreter 165 compares third feature vector 235 to second feature vector 230 by determining a similarity index based on the dot product between third feature vector 235 and second feature vector 230. If the similarity index is below a set threshold, interpreter 165 assumes that third feature vector 235 corresponds to a different sign-language pattern than first feature vector 225 and second feature vector 230.

Interpreter 165 next compares third feature vector 235 to fourth feature vector 240 to determine if this different sign-language pattern is a motionless sign-language pattern, or a moving sign-language gesture. In certain embodiments, interpreter 165 compares third feature vector 235 to fourth feature vector 240 by determining a distance between third feature vector 235 and fourth feature vector 240. If the distance is greater than a set tolerance 245, interpreter 165 assumes that third feature vector 235 and fourth feature vector 240 belong to the same moving sign-language gesture. In certain embodiments, interpreter 165 compares third feature vector 235 to fourth feature vector 240 by determining a similarity index based on the dot product between third feature vector 235 and fourth feature vector 240. If the similarity index is below a set threshold, interpreter 165 assumes that third feature vector 235 and fourth feature vector 240 belong to the same moving sign-language gesture.

Interpreter 165 next compares third feature vector 235 and fourth feature vector 240 to feature vector groups 150A and 150B, stored in second collection 150 in dictionary 140, to determine to which word or phrase third feature vector 235 and fourth feature vector 240 correspond. In certain embodiments, this comparison includes determining distances between third feature vector 235 and fourth feature vector 240 and the feature vectors in feature vector groups 150A and 150B to determine the closest match. In further embodiments, ATM 120 uses a machine learning model to determine which of feature vector groups 150A and 150B third feature vector 235 and fourth feature vector 240 most closely resemble. This disclosure contemplates that any machine learning model may be used for this purpose. For example, in certain embodiments the machine learning model includes a linear classifier model.

In certain embodiments, interpreter 165 determines whether first feature vector 225, second feature vector 230, third feature vector 235, and fourth feature vector 240 correspond to a user-defined sign-language pattern stored in dictionary 140. In such embodiments, first feature vector 225, second feature vector 230, third feature vector 235, and fourth feature vector 240 correspond to a hand gesture 105A representing an attempt to authenticate the identity of user 105 to gain access to the user's account. In such embodiments, rather than determining which grouping of feature vectors 150A and 150B, stored in second collection 150 in dictionary 140, first feature vector 225, second feature vector 230, third feature vector 235, and fourth feature vector 240 most closely resemble, interpreter 165 determines whether first feature vector 225, second feature vector 230, third feature vector 235, and fourth feature vector 240 are similar to any groupings of feature vectors 150A and 150B stored in second collection 150 in memory 140 within a set tolerance. In certain embodiments, determining whether first feature vector 225, second feature vector 230, third feature vector 235, and fourth feature vector 240 are similar to any groupings of feature vectors 150A and 150B, within a set tolerance, includes determining the distances between the first feature vector 225, second feature vector 230, third feature vector 235, and fourth feature vector 240 and the feature vectors stored in the groupings of feature vectors 150A and 150B. In further embodiments, determining the similarity includes determining dot products between the first feature vector 225, second feature vector 230, third feature vector 235, and fourth feature vector 240 and the feature vectors stored in the groupings of feature vectors 150A and 150B. If first feature vector 225, second feature vector 230, third feature vector 235, and fourth feature vector 240 are not similar within the set tolerance to any of the groupings of feature vectors 150A and 150B stored in second collection 150, ATM 120 rejects the authentication attempt. In this manner, certain embodiments of ATM 120 can provide enhanced security to the account of a user 105.

Figure 3:
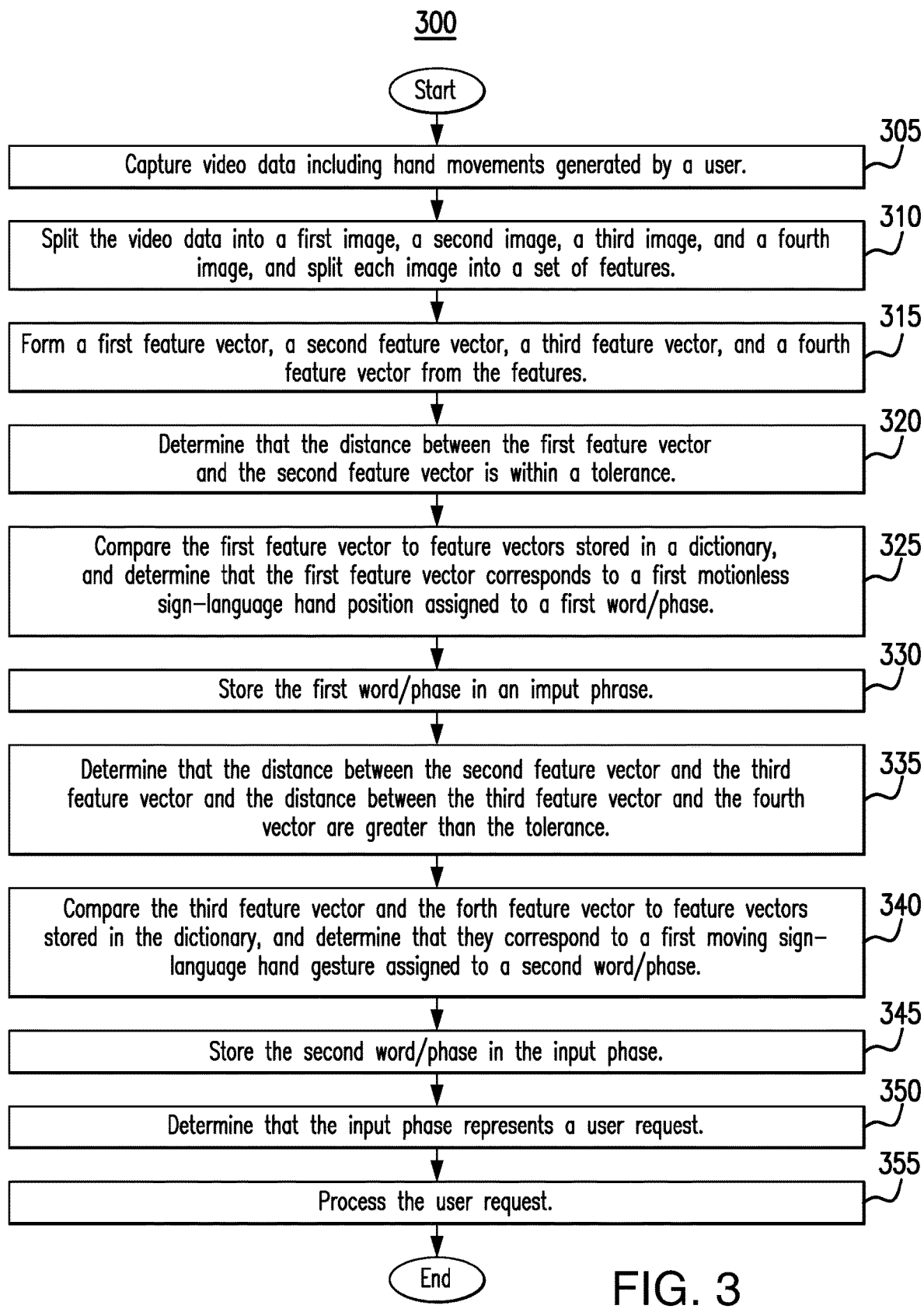
FIG. 3 presents a flowchart illustrating the process by which the sign-language automated teller machine in the system of FIG. 1 converts a user's hand gestures into an input request to process.

FIG. 3 further illustrates the process by which sign-language ATM 120 converts a user's hand gestures into an input request 170 to process. In step 305, camera 125 captures video data 155 including hand movements 105A generated by user 105. In step 310, image still extractor 160 spits video data 155 into a first image 205, second image 210, third image 215, and fourth image 220. Interpreter 165 then splits each image into a set of features. In certain embodiments, these features include locations/orientations of various parts of each finger on each hand. Interpreter 165 further forms first vector 225, second vector 230, third vector 235, and fourth vector 240 from the features, in step 315. In certain embodiments, a machine learning model is used to split each image into the set of features. For example, a machine learning model may be trained to extract pixels corresponding to the hands of a user 105 from image stills 205, 210, 215, and 220.

In step 320, ATM 120 determines that the distance between first feature vector 225 and second feature vector 230 is less than tolerance 245. As a result, in step 325, ATM 120 compares first feature vector 225 to feature vectors 145A, 145B, and 145C stored in first collection 145 in dictionary 140. In certain embodiments, ATM 120 uses a machine learning model to perform this comparison. For example, by way of illustration and not limitation, ATM 120 may use a linear classifier machine learning model to perform the comparison. Based on this comparison, ATM 120 determines that first feature vector 225 corresponds to a first motionless sign-language pattern 145A assigned to a first word or phrase. In step 330, ATM 120 stores the first word or phrase in an input phrase 170.

In step 335, ATM 120 determines that the distance between second feature vector 230 and third feature vector 235 is greater than tolerance 245, and that the distance between third feature vector 235 and fourth feature vector 240 is also greater than tolerance 245. As a result, in step 340, ATM 120 compares third feature vector 235 and fourth feature vector 240 to groupings of feature vectors 150A and 150B stored in second collection 150 in dictionary 140. In certain embodiments, ATM 120 uses a machine learning model to perform the comparison. For example, by way of illustration and not limitation, ATM 120 may use a linear classifier machine learning model to perform the comparison. Based on this comparison, ATM 120 determines that third feature vector 235 and fourth feature vector 240 correspond to a first moving sign-language gesture 150A assigned to a second word or phrase. In step 345, ATM 120 stores the second word or phrase in the input phrase 170. In step 350, ATM 120 determines that input phrase 170 represents a user request. As a result, ATM 120 processes the request.

Modifications, additions, or omissions may be made to method 300 depicted in FIG. 3. Method 300 may include more, fewer, or other steps. For example, steps may be performed in parallel or in any suitable order. While discussed as ATM 120 (or components thereof) performing the steps, any suitable component of system 100, such as mobile device(s) 110, for example, may perform one or more steps of the method.

Figure 4:
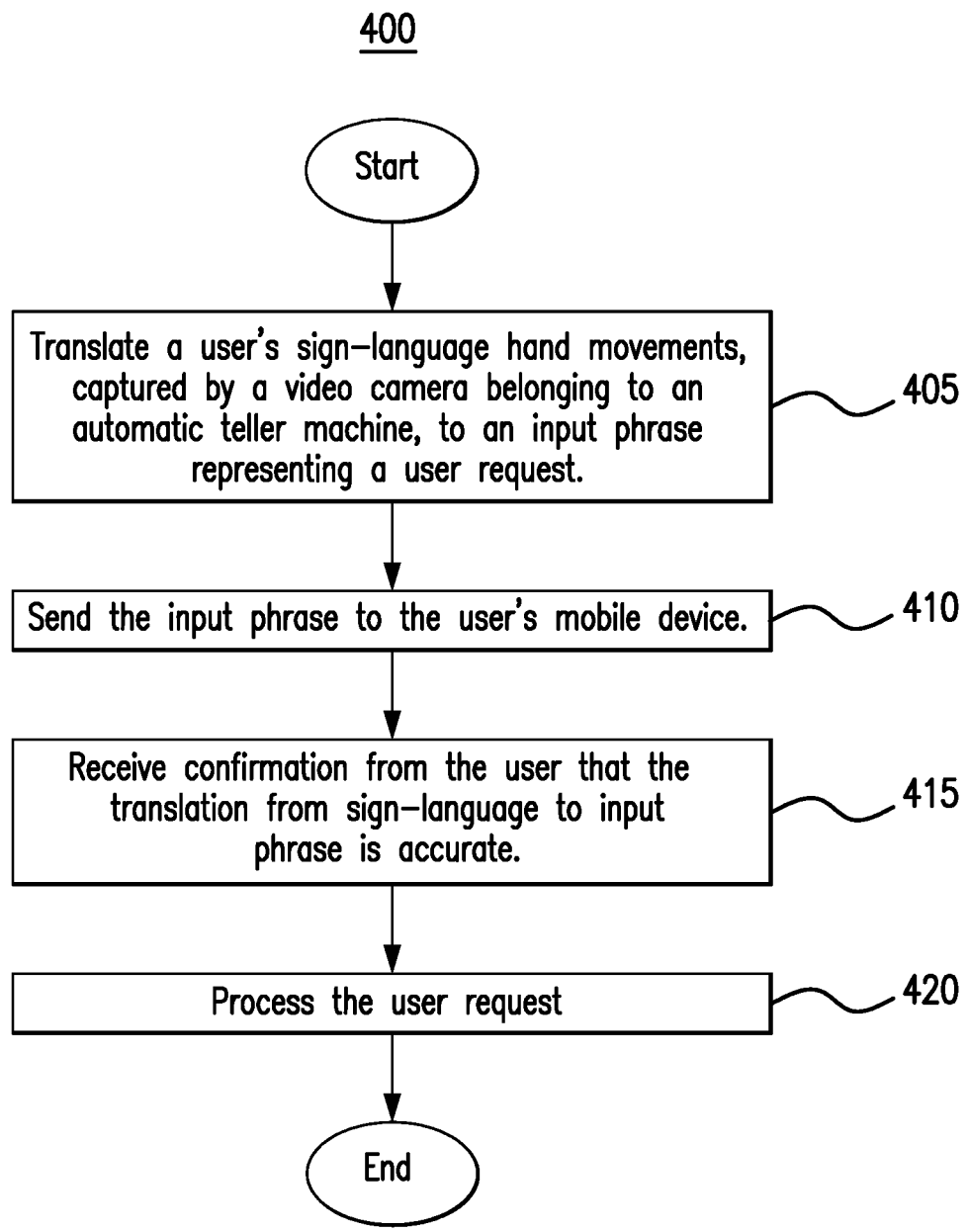
FIG. 4 presents a flowchart illustrating the process by which the sign-language automated teller machine in the system of FIG. 1 confirms that it correctly translated the user's hand gestures to text.

FIG. 4 illustrates the process by which, in certain embodiments, sign-language ATM 120 confirms that it has correctly translated a user's hand gestures 105A to textual input phrase 170. In step 405, ATM 120 translates sign-language hand movements 105A generated by user 105 and captured by camera 125 into input phrase 170, representing a user request, using method 300, described above in the discussion of FIG. 3.

In step 410, ATM 120 sends input phrase 170 to a mobile device 110 of user 105. In step 415, user 105 sends a confirmation message to ATM 120 indicating that the translation of the sign-language hand movements 105A into input phrase 170 is correct and ATM 120 receives the confirmation. Next, in step 420, ATM 120 processes the user request represented by input phrase 170.

Modifications, additions, or omissions may be made to method 400 depicted in FIG. 4. Method 400 may include more, fewer, or other steps. For example, steps may be performed in parallel or in any suitable order. While discussed as ATM 120 (or components thereof) performing the steps, any suitable component of system 100, such as mobile device(s) 110, for example, may perform one or more steps of the method.

Figure 5:
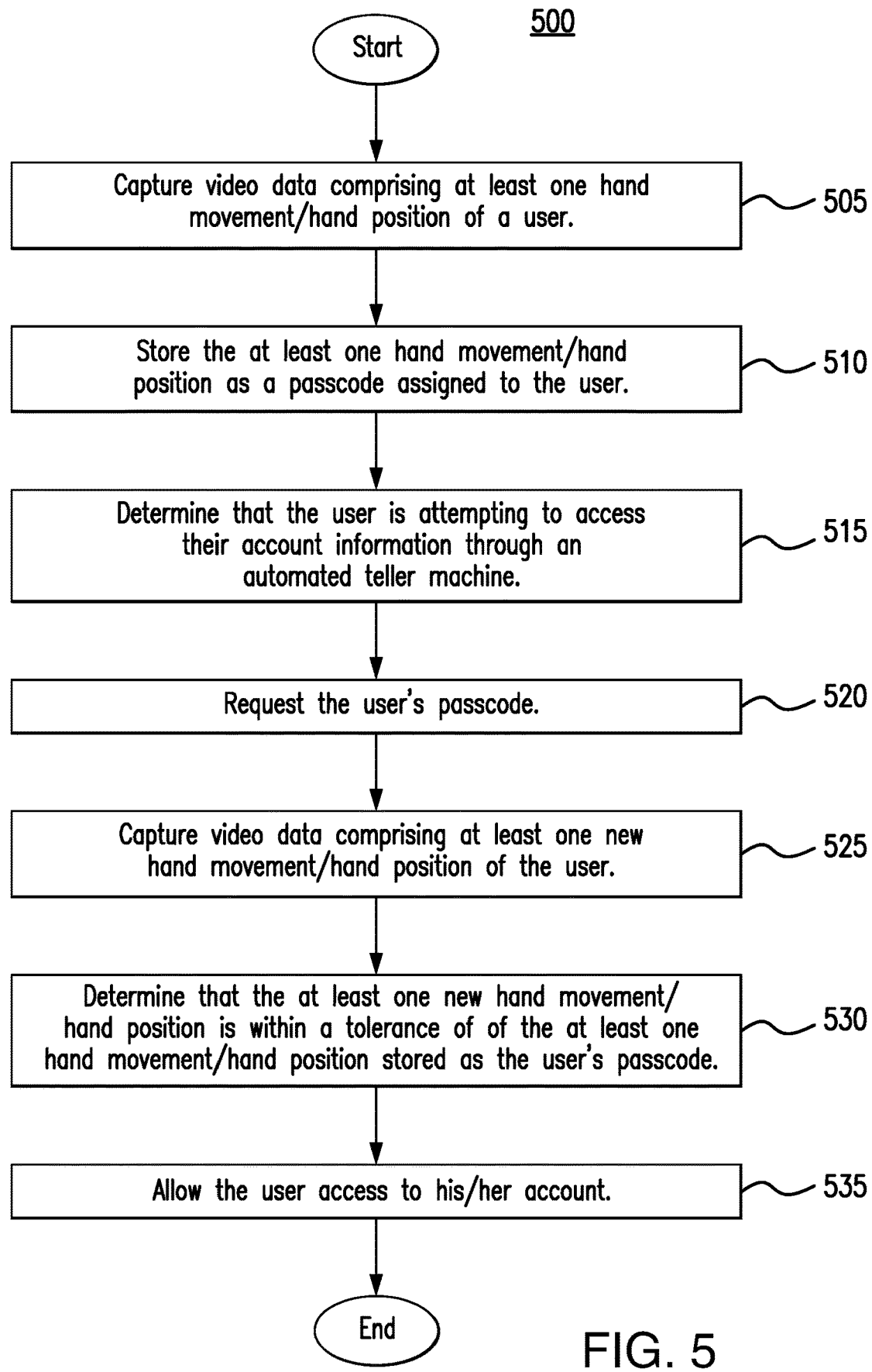
FIG. 5 presents a flowchart illustrating the process by which the sign-language automated teller machine in the system of FIG. 1 stores and uses a user's hand gestures as a passcode for accessing the machine.

FIG. 5 further illustrates the process by which, in certain embodiments, sign-language ATM stores a user-generated hand gesture 105A and uses the user-generated hand gesture 105A as a passcode for accessing ATM 120. In step 505, ATM 120 captures video data 155 including at least one hand movement/hand position 105A of user 105, using camera 125. In step 510, ATM 120 stores the at least one hand movement/hand position 105A as a passcode assigned to user 105 in memory 135. In certain embodiments, storing the at least one hand movement/hand position 105A as a passcode assigned to user 105 includes splitting video data 155 into a set of image stills using image still extractor 160, splitting each image still into a set of features, and forming vectors using the features. In certain embodiments, a machine learning model is used to split each image into the set of features. For example, a machine learning model may be trained to extract pixels corresponding to the hands of a user 105 from the image stills.

In step 515, ATM 120 determines that user 105 is attempting to access his/her account information. For example, user 105 may have inserted an account card into the ATM. In step 520, ATM 120 displays a message requesting the user's passcode. In step 525, ATM 120 captures video data 155 including at least one new hand movement/hand position 105A of user 105. Next, in step 530, ATM 120 determines that the at least one new hand movement/hand position is within a tolerance of the at least one hand movement/hand position stored as the user's passcode in memory 135. In certain embodiments, determining that the at least one new hand movement/hand position is within a tolerance of the at least one hand movement/hand position stored as the user's passcode in memory 135 includes splitting video data 155 into a set of images, splitting each image into a set of features, and forming vectors from the features. The determination further includes determining whether these feature vectors are similar to those stored as the user's passcode in memory 135. In certain embodiments, determining whether these feature vectors are similar to those stored as the user's passcode in memory 135 includes determining that distances between the feature vectors and those stored in memory are less than a set tolerance. In further embodiments, determining the similarity includes determining that dot products between the feature vectors and those stored in memory produce similarity indices greater than a set threshold. If the feature vectors are similar to those stored as the user's passcode in memory 135, within a set tolerance, in step 535 ATM 120 allows user 105 to access to his/her account.

Modifications, additions, or omissions may be made to method 500 depicted in FIG. 5. Method 500 may include more, fewer, or other steps. For example, steps may be performed in parallel or in any suitable order. While discussed as ATM 120 (or components thereof) performing the steps, any suitable component of system 100, such as mobile device(s) 110, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An automated teller machine comprising:
    a camera configured to capture video data from a user, the video data comprising at least one hand movement generated by the user;
    a memory configured to store a dictionary of sign-language patterns, each sign-language pattern assigned to a word or a phrase, the dictionary comprising:
        a first collection of feature vectors, each feature vector of the first collection assigned to a first type of sign-language pattern comprising a motionless sign-language hand position; and
        a second collection of groupings of feature vectors, each grouping of feature vectors of the second collection comprising at least two feature vectors and assigned to a second type of sign-language pattern comprising a moving sign-language hand gesture;
    a hardware processor, communicatively coupled to the camera and the memory, the processor configured to:
        receive the video data from the camera;
        split the video data into a first image, a second image, a third image, and a fourth image;
        split the first image into a first set of features;
        form a first feature vector based on the first set of features;
        split the second image into a second set of features;
        form a second feature vector based on the second set of features;
        split the third image into a third set of features;
        form a third feature vector based on the third set of features;

split the fourth image into a fourth set of features;
form a fourth feature vector based on the fourth set of features;
determine a first distance between the first feature vector and the second feature vector;
determine that the first distance is within a set tolerance;
in response to determining that the first distance is within the set tolerance:
compare the first feature vector to the feature vectors in the first collection of feature vectors;
determine, based on the comparison of the first feature vector to the feature vectors in the first collection of feature vectors, that the first feature vector corresponds to a first motionless sign-language hand position assigned to a first word or a first phrase; and
store the first word or the first phrase in an input phrase;
determine a second distance between the second feature vector and the third feature vector;
determine a third distance between the third feature vector and the fourth feature vector;
determine that the second distance is not within the set tolerance;
determine that the third distance is not within the set tolerance;
in response to determining that the second distance is not within the set tolerance and that the third distance is not within the set tolerance:
compare the third feature vector and the fourth feature vector to the groupings of feature vectors in the second collection of groupings of feature vectors;
determine, based on the comparison of the third feature vector and the fourth feature vector to the groupings of feature vectors in the second collection of groupings of feature vectors, that the third feature vector and the fourth feature vector comprise a first moving sign-language hand gesture assigned to a second word or a second phrase; and
store the second word or the second phrase in the input phrase;
determine that the input phrase represents a user request; and
in response to determining that the input phrase represents the user request, process the user request.

2. The automated teller machine of claim 1, wherein the processor is further configured to:
in response to determining that the input phrase corresponds to the user request:
send the input phrase to a device belonging to the user; and
receive a response from the user indicating that the input phrase is correct, prior to processing the user request.

3. The automated teller machine of claim 2, wherein the device is a smart phone or tablet and the input phrase is sent as a text message or an application notification.

4. The automated teller machine of claim 1, wherein the user request is a request for account information, and the processor is further configured to, in response to processing the user request, send the account information to a device belonging to the user.

5. The automated teller machine of claim 1, wherein the user may store a user-defined sign-language pattern in the dictionary of sign-language patterns.

6. The automated teller machine of claim 5, wherein the user request corresponds to a passcode for user authentication.

7. The automated teller machine of claim 1, where the processes of determining that the first feature vector corresponds to the first motionless sign-language hand position and determining that the third feature vector and the fourth feature vector comprise the first moving sign-language hand gesture comprise using a machine learning model.

8. A method for an automated teller machine comprising:
receiving video data from a camera, the camera configured to capture the video data from a user, the video data comprising at least one hand movement generated by the user;
splitting the video data into a first image, a second image, a third image, and a fourth image;
splitting the first image into a first set of features;
forming a first feature vector based on the first set of features;
splitting the second image into a second set of features;
forming a second feature vector based on the second set of features;
splitting the third image into a third set of features;
forming a third feature vector based on the third set of features;
splitting the fourth image into a fourth set of features;
forming a fourth feature vector based on the fourth set of features;
determining a first distance between the first feature vector and the second feature vector;
determining that the first distance is within a set tolerance;
in response to determining that the first distance is within the set tolerance:
comparing the first feature vector to feature vectors stored in a first collection of feature vectors, each feature vector of the first collection assigned to a first type of sign-language pattern comprising a motionless sign-language hand position;
determining, based on the comparison of the first feature vector to the feature vectors stored in the first collection of feature vectors, that the first feature vector corresponds to a first motionless sign-language hand position assigned to a first word or a first phrase; and
storing the first word or the first phrase in an input phrase;
determining a second distance between the second feature vector and the third feature vector;
determining a third distance between the third feature vector and the fourth feature vector;
determining that the second distance is not within the set tolerance;
determining that the third distance is not within the set tolerance;
in response to determining that the second distance is not within the set tolerance and that the third distance is not within the set tolerance:
comparing the third feature vector and the fourth feature vector to groupings of feature vectors stored in a second collection of groupings of feature vectors, each grouping of feature vectors stored in the second collection comprising at least two feature vectors and assigned to a second type of sign-language pattern comprising a moving sign-language hand gesture;
determining, based on the comparison of the third feature vector and the fourth feature vector to the groupings of feature vectors in the second collection of groupings of feature vectors, that the third feature vector and the fourth feature vector comprise a first moving sign-language hand gesture assigned to a second word or a second phrase; and storing the second word or the second phrase in the input phrase;

determining that the input phrase represents a user request; and in response to determining that the input phrase represents the user request, processing the user request.

9. The method claim 8, further comprising:

in response to determining that the input phrase corresponds to the user request:

sending the input phrase to a device belonging to the user; and receiving a response from the user indicating that the input phrase is correct, prior to processing the user request.

10. The method of claim 9, wherein the device is a smart phone or tablet and the input phrase is sent as a text message or an application notification.

11. The method of claim 8, wherein the user request is a request for account information, and the method further comprises, in response to processing the user request, sending the account information to a device belonging to the user.

12. The method of claim 8, wherein the user may store a user-defined sign-language pattern in the dictionary of sign-language patterns.

13. The method of claim 12, wherein the user request corresponds to a passcode for user authentication.

14. The method of claim 8, wherein determining that the first feature vector corresponds to the first motionless sign-language hand position and determining that the third feature vector and the fourth feature vector comprise the first moving sign-language hand gesture comprise using a machine learning model.

15. A system comprising:

an automated teller machine;

a camera configured to capture video data from a user, the video data comprising at least one hand movement generated by the user;

a storage element configured to store a dictionary of sign-language patterns, each sign-language pattern assigned to a word or a phrase, the dictionary comprising:

a first collection of feature vectors, each feature vector of the first collection assigned to a first type of sign-language pattern comprising a motionless sign-language hand position; and a second collection of groupings of feature vectors, each grouping of feature vectors of the second collection comprising at least two feature vectors and assigned to a second type of sign-language pattern comprising a moving sign-language hand gesture;

a processing element, communicatively coupled to the automated teller machine, the camera, and the memory, the processing element operable to:

receive the video data from the camera;

split the video data into a first image, a second image, a third image, and a fourth image;

split the first image into a first set of features;

form a first feature vector based on the first set of features;

split the second image into a second set of features;

form a second feature vector based on the second set of features;

split the third image into a third set of features;

form a third feature vector based on the third set of features;

split the fourth image into a fourth set of features;

form a fourth feature vector based on the fourth set of features;

determine a first distance between the first feature vector and the second feature vector;

determine that the first distance is within a set tolerance;

in response to determining that the first distance is within the set tolerance:

compare the first feature vector to the feature vectors in the first collection of feature vectors;

determine, based on the comparison of the first feature vector to the feature vectors in the first collection of feature vectors, that the first feature vector corresponds to a first motionless sign-language hand position assigned to a first word or a first phrase; and store the first word or the first phrase in an input phrase;

determine a second distance between the second feature vector and the third feature vector;

determine a third distance between the third feature vector and the fourth feature vector;

determine that the second distance is not within the set tolerance;

determine that the third distance is not within the set tolerance;

in response to determining that the second distance is not within the set tolerance and that the third distance is not within the set tolerance:

compare the third feature vector and the fourth feature vector to the groupings of feature vectors in the second collection of groupings of feature vectors;

determine, based on the comparison of the third feature vector and the fourth feature vector to the groupings of feature vectors in the second collection of groupings of feature vectors, that the third feature vector and the fourth feature vector comprise a first moving sign-language hand gesture assigned to a second word or a second phrase; and store the second word or the second phrase in the input phrase;

determine that the input phrase represents a user request; and in response to determining that the input phrase represents a user request:

send the input phrase to a device belonging to the user;

receive a response from the user indicating that the input phrase is correct; and process the user request.

16. The system of claim 15, wherein the device is a smart phone or tablet and the input phrase is sent as a text message or an application notification.

17. The system of claim 15, wherein the user request is a request for account information, and the processing element is further operable to, in response to processing the user request, send the account information to a device belonging to the user.

18. The system of claim 15, wherein the user may store a user-defined sign-language pattern in the dictionary of sign-language patterns.

19. The system of claim 18, wherein the user request corresponds to a passcode for user authentication.

20. The system of claim 15, where the processes of determining that the first feature vector corresponds to the first motionless sign-language hand position and determining that the third feature vector and the fourth feature vector comprise the first moving sign-language hand gesture comprise using a machine learning model.

\* \* \* \* \*